(12) United States Patent
Heo et al.

(10) Patent No.: US 10,831,362 B2
(45) Date of Patent: Nov. 10, 2020

(54) MOBILE TERMINAL AND OBJECT CHANGE SUPPORT METHOD FOR THE SAME

(71) Applicant: Samsung Electronics Co., Ltd., Suwon-si (KR)

(72) Inventors: Nam Jo Heo, Seongnam-si (KR); Sang Yup Lee, Gwangju-si (KR); Yong Seok Kim, Suwon-si (KR); Kwang Sub Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/104,704

(22) Filed: Aug. 17, 2018

(65) Prior Publication Data

US 2018/0356955 A1    Dec. 13, 2018

Related U.S. Application Data

(63) Continuation of application No. 13/417,489, filed on Mar. 12, 2012, now abandoned.

(30) Foreign Application Priority Data

Mar. 21, 2011  (KR) .................. 10-2011-0024763

(51) Int. Cl.
*G06F 3/0488* (2013.01)
*G06F 3/0481* (2013.01)
*G06F 3/0484* (2013.01)

(52) U.S. Cl.
CPC .......... *G06F 3/0488* (2013.01); *G06F 3/0481* (2013.01); *G06F 3/04817* (2013.01); *G06F 3/04845* (2013.01); *G06F 3/04886* (2013.01)

(58) Field of Classification Search
CPC .. G06F 3/0488; G06F 3/0481; G06F 3/04886; G06F 3/04817; G06F 3/04845;
(Continued)

(56) References Cited

U.S. PATENT DOCUMENTS 6,742,042 B1   5/2004  Holden et al.
6,909,439 B1   6/2005  Amro et al.
(Continued)

FOREIGN PATENT DOCUMENTS

CN   1802691 A   7/2006
CN   1811686 A   8/2006
(Continued)

OTHER PUBLICATIONS

Lars Aronsson, 11 Ways to Geth the Most Out of LauncherPro, Androinic a, YulMedia Blog Network, [online], Aug. 23, 2010, URL, http://androinica.com/2010/08/11-ways-to-get-the-most-out-of-launcherpro/, [searched on Feb. 26, 2016].
(Continued)

*Primary Examiner* — Jennifer N To
*Assistant Examiner* — Ashley M Fortino
(74) *Attorney, Agent, or Firm* — Jefferson IP Law, LLP

(57) ABSTRACT

A mobile terminal and a method of supporting an object change for the same are provided. The mobile terminal includes a display unit for outputting at least one object, and a control unit for controlling at least one of directly displaying, in response to a signal for changing the output object into a second object having a similar function but being of a different type than the output object, the second object on the display unit without a screen transition, and for outputting, in response to a signal for changing the output object into a second object having a similar function but being of
(Continued)

a different type than the output object, a guide frame on the display unit so as to facilitate change of the output object without a screen transition.

28 Claims, 6 Drawing Sheets

(58) Field of Classification Search
CPC .......... G06F 3/1407; G06F 3/14; G06F 3/048; H04M 1/72583; H04W 88/02
See application file for complete search history.

(56) References Cited

U.S. PATENT DOCUMENTS

| | | | |
|---|---|---|---|
| 7,119,797 B2 | 10/2006 | Kawano et al. | |
| 7,302,650 B1 | 11/2007 | Allyn et al. | |
| 7,779,362 B1 | 8/2010 | Castrucci et al. | |
| 7,949,954 B1 | 5/2011 | Jezek, Jr. | |
| 8,775,957 B2 | 7/2014 | Kim | |
| 2004/0013246 A1 | 1/2004 | Back et al. | |
| 2005/0246313 A1 | 11/2005 | Turski et al. | |
| 2006/0005207 A1* | 1/2006 | Louch | G06F 8/38 719/328 |
| 2006/0015820 A1 | 1/2006 | Wood | |
| 2006/0200778 A1 | 9/2006 | Gritzman et al. | |
| 2007/0283280 A1 | 12/2007 | Butlin et al. | |
| 2008/0059914 A1 | 3/2008 | Allyn et al. | |
| 2008/0165148 A1 | 7/2008 | Williamson et al. | |
| 2008/0244450 A1 | 10/2008 | Hisada et al. | |
| 2009/0217186 A1 | 8/2009 | Pyhalammi et al. | |
| 2009/0228820 A1 | 9/2009 | Kim et al. | |
| 2010/0085318 A1 | 4/2010 | Lee et al. | |
| 2010/0090971 A1 | 4/2010 | Choi et al. | |
| 2010/0138295 A1 | 6/2010 | Caron et al. | |
| 2010/0262938 A1 | 10/2010 | Woods et al. | |
| 2011/0016386 A1 | 1/2011 | Odagiri et al. | |
| 2011/0047510 A1 | 2/2011 | Yoon | |
| 2011/0061021 A1 | 3/2011 | Kang et al. | |
| 2011/0080364 A1 | 4/2011 | Ording et al. | |
| 2011/0145759 A1* | 6/2011 | Leffert | G06F 3/04845 715/800 |
| 2011/0302532 A1 | 12/2011 | Missig | |
| 2011/0320939 A1 | 12/2011 | Hand et al. | |
| 2012/0246586 A1 | 9/2012 | Heo et al. | |

FOREIGN PATENT DOCUMENTS

| | | |
|---|---|---|
| CN | 101052939 A | 10/2007 |
| CN | 101124572 A | 2/2008 |
| CN | 101276256 A | 10/2008 |
| CN | 101510008 A | 8/2009 |
| CN | 101527745 A | 9/2009 |
| CN | 101714057 A | 5/2010 |
| CN | 101833417 A | 9/2010 |
| CN | 102710739 A | 10/2012 |
| EP | 2431870 A2 | 3/2012 |
| EP | 2469388 A2 | 6/2012 |
| EP | 2474879 A2 | 7/2012 |
| JP | 2000-13549 A | 1/2000 |
| JP | 2003-195998 A | 7/2003 |
| JP | 2011-022914 A | 2/2011 |
| KR | 10-2010-0023891 A | 3/2010 |
| KR | 10-2010-0070819 A | 6/2010 |
| KR | 10-2010-0097358 A | 9/2010 |
| KR | 10-2011-0026970 A | 3/2011 |
| KR | 10-2011-0027378 A | 3/2011 |
| RU | 2242043 C2 | 12/2004 |
| RU | 2383919 C2 | 3/2010 |
| WO | 02/01474 A2 | 1/2002 |
| WO | 2008/085747 A2 | 7/2008 |
| WO | 2010/117610 A1 | 10/2010 |

OTHER PUBLICATIONS

Galaxy S Widget, Change Galaxy S with various widgets (launcher pro, Fancy Widget, Galaxy S), Jul. 15, 2010, http://prologue.blog.naver.com/PostView.nhn?ologId=namfx&logNo=109163848&parentCategoryNo=21&categoryNo=&viewDate=&isShowPopularPosts=false&from=postList.

Bovens, Opera Widgets go mobile, Apr. 22, 2010, DEV.OPERA, pp. 1-3, p. 3 paragraph 3 lines 1-2.

Davis et al., Opera Mobile 10 developer's introduction, Mar. 16, 2010, pp. 1-7, p. 1 Opera Mobile 10 features section.

Indian Office Action dated Sep. 17, 2019, issued in Indian Application No. 6785/CHENP/2013.

Ars reviews the Motorola Droid X (https://arstechnica.com/gadgets/2010107/ars-reviews-the-motorola-droid-x/61), Jul. 22, 2010.

Extended European Search Report dated Jun. 8, 2020, issued in European Application No. 19213025.0-1216.

Ars reviews the Motorola Droid X (https://arstechnica.com/gadgets/2010/07/ars-reviews-the-motorola-droid-x/6/), Jul. 11, 2003.

Indian Hearing Notice dated Jul. 10, 2020, issued in the Indian Application No. 6785/CHENP/2013.

* cited by examiner

MOBILE TERMINAL AND OBJECT CHANGE SUPPORT METHOD FOR THE SAME

PRIORITY

This application is a continuation application of prior application Ser. No. 13/417,489, filed on Mar. 12, 2012, which was based on and claimed priority under 35 U.S.C. § 119(a) of a Korean patent application number 10-2011-0024763, filed on Mar. 21, 2011, in the Korean Intellectual Property Office, the disclosure of which is incorporated by reference herein in its entirety.

BACKGROUND OF THE INVENTION

1. Field of the Invention

The present invention relates to a mobile terminal. More particularly, the present invention relates to a mobile terminal and object change support method for a mobile terminal that enables a user to adjust properties of objects on the screen in an easy and convenient manner.

2. Description of the Related Art

Mobile terminals support call functions based on mobility. Because of their convenience of use and high portability, mobile terminals have entered into widespread use. To support user functions, mobile terminals may provide various input mechanisms. For example, if a mobile terminal provides a touchscreen including a touch panel and a display unit, then the user may select an image on the display unit by making a gesture on the touch panel. For example, the gesture may include merely touching an area of the touch panel. The mobile terminal may generate a touch event corresponding to the gesture and control an application program for a user function according to the touch event.

To support high mobility, mobile terminals have a small display area in comparison to other devices. Hence, a mobile terminal may have to output various types of information for different functions on a small display area. Recently in particular, smartphones have been widely popularized. A user of a smartphone may select one of various objects displayed on the screen to execute a desired function. However, to provide various types of information on a small screen, an existing smartphone tends to provide only uniformly standardized objects of fixed sizes. Hence, a user may experience difficulty in rapidly recognizing functions associated with individual objects and selection of a desired object. In addition, output objects tend to have fixed images, making provision of various personalized information based on user preferences difficult. These problems may become more serious for objects outputting specialized information like widget objects.

SUMMARY OF THE INVENTION

Aspects of the present invention are to address at least the above-mentioned problems and/or disadvantages and to provide at least the advantages described below. Accordingly, an aspect of the present invention is to provide a mobile terminal and object change support method for a mobile terminal that enable a user to freely adjust properties, such as size and information arrangement, of objects on the screen in an easy and convenient manner.

In accordance with an aspect of the present invention, an object change support method for a mobile terminal is provided. The method includes outputting at least one object on a display unit, receiving a signal for property change of the object, and changing, in response to the property change signal, the object into one of second objects that are identical in function to but differ in type from the object.

In accordance with another aspect of the present invention, an object change support method for a mobile terminal is provided. The method includes outputting at least one object on a display unit, receiving a signal for property change of the object, outputting, in response to the property change signal, a guide frame on the display unit wherein the guide frame facilitates changing the object into one of second objects that are identical in function to but differ in type from the object.

In accordance with another aspect of the present invention, a mobile terminal capable of object change support is provided. The terminal includes a display unit outputting one of objects that are identical in function but differ in type, and a control unit controlling at least one of directly displaying, in response to a signal for changing the output object into a second object of a different type, the second object of the different type on the display unit without a screen transition, and outputting, in response to a signal for changing the output object into a second object of a different type, a guide frame on the display unit so as to facilitate change of the output object without a screen transition.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
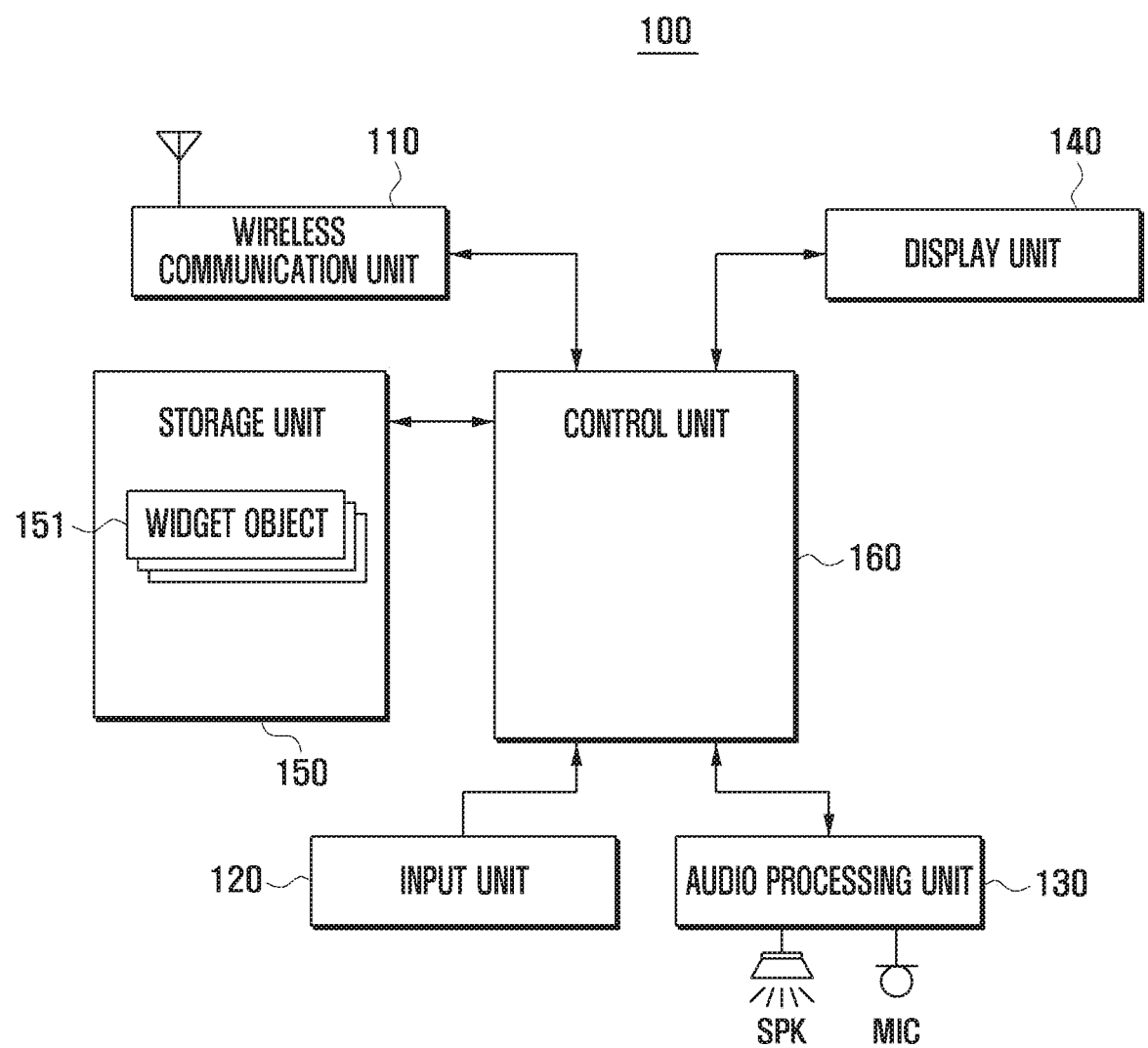
FIG. 1 is a block diagram of a mobile terminal according to an exemplary embodiment of the present invention.

FIG. 1 is a block diagram of a mobile terminal according to an exemplary embodiment of the present invention.

Referring to FIG. 1, the mobile terminal 100 may include a wireless communication unit 110, an input unit 120, an audio processing unit 130, a display unit 140, a storage unit 150 and a control unit 160. In the following description, object change signals may be generated by the display unit 140 having a touchscreen capability and/or the input unit 120.

The mobile terminal 100 having the above configuration may display an idle screen on the display unit 140 according to preset scheduling information after the mobile terminal 100 is powered on. The mobile terminal 100 may output various objects associated with different functions on the idle screen. In particular, the mobile terminal 100 may output at least one widget object 151 on the display unit 140. The mobile terminal 100 may adjust the size or properties of the widget object 151 according to user selection. For example, the mobile terminal 100 may support adjustment of the widget object 151 in the current screen without page transition for screen adjustment, thereby facilitating object adjustment. A description is of individual components of the mobile terminal 100 is provided in connection with an object change support function. The object change support function is described focusing on widget objects. However, the object change support function is not limited to widget objects, and may be applied to other types of objects according to user settings or design.

The wireless communication unit 110 establishes a communication channel for voice, video, and data communication under the control of the control unit 160. That is, the wireless communication unit 110 establishes a communication channel for a voice call, a data call, and a video call to a mobile communication system. To achieve this, the wireless communication unit 110 may include a radio frequency transmitter for upconverting the frequency of a signal to be transmitted and amplifying the signal, and a radio frequency receiver for low-noise amplifying a received signal and downconverting the frequency of the received signal. In particular, the wireless communication unit 110 may establish a data communication channel with an external server or another mobile terminal, and receive specific data in real time, periodically, or upon request through the data communication channel. The received data may be applied to a widget object 151 on the display unit 140. For example, real-time weather information from an external server may be applied to a widget object 151 handling weather information. A message received from an external server or another mobile terminal may be applied to a widget object 151 handling messages. Here, a message may be a text message, multimedia message, or e-mail message. Stock quotations periodically received from an external server may be applied to a widget object 151 handling stock exchange information. When specific data is received through the wireless communication unit 110, the control unit 160 applies at least some of the received data to the corresponding widget object 151 on the display unit 140, causing an update of information output by the widget object 151.

The input unit 120 includes a plurality of alphanumeric and function keys for inputting alphanumeric information and for setting various functions. The function keys may include direction, side, and shortcut keys associated with specific functions. The input unit 120 generates a key signal corresponding to user manipulation for setting and control of the operation of the mobile terminal 100, and sends the generated key signal to the control unit 160. The input unit 120 may be configured as a keypad having multiple keys in a Qwerty, a 3*4, or a 4*3 layout. The input unit 120 may also be configured as a key map of a Qwerty, a 3*4, or a 4*3 layout displayed on the display unit 140. If the mobile terminal 100 is a full touchscreen type terminal, then the input unit 120 may include only side keys formed at sides of the case of the mobile terminal 100. The input unit 120 may generate an input signal for changing a widget object 151. For example, if the mobile terminal 100 includes preset input keys (i.e., if the terminal is not a full touchscreen type terminal), then the mobile terminal 100 may output information specifying at least one reference point for changing the widget object 151. The mobile terminal 100 may change the widget object 151 based on user manipulation of the input unit. For example, the input unit 120 may generate an input signal for selecting a reference point according to user manipulation and send the generated input signal to the control unit 160.

The audio processing unit 130 includes a speaker SPK for outputting audio data during a call and outputting audio data contained in a received message or stored in the storage unit 150, and a microphone MIC for collecting an audio signal such as a voice signal during a call. The audio processing unit 130 may output an audible alert indicating adjustment of a widget object 151 according to user settings. For example, when the user generates an input signal for changing properties of a widget object 151 displayed on the idle screen, the audio processing unit 130 may output an audible alert indicating transition to a property change mode for the widget object 151. When a touch gesture or input signal is generated during the property change mode for the widget object 151, the audio processing unit 130 may output a corresponding audible alert.

If the mobile terminal 100 has a touchscreen capability, the display unit 140 may include a display panel and a touch panel. For example, the display unit 140 may be configured such that the display panel is covered by the touch panel. Accordingly, the size of the display unit 140 may be determined by the size of the touch panel.

The display panel displays various menus of the mobile terminal 100, information input by the user, and information to be provided to the user. For example, the display panel may output various screens related to usage of the mobile terminal 100, such as an idle screen, a menu screen, a message handling screen, and a call handling screen. The display panel may be configured using liquid crystal display (LCD) devices, organic light emitting diodes (OLED), or the like. The display panel may be placed above or below the touch panel. In particular, the display panel may output at least one widget object 151 according to user settings. The mobile terminal 100 may provide a list of available widget objects 151, and the user may select a desired widget object 151 to be displayed on the display panel. Properties (e.g., size, shape, etc.) of a widget object 151 on the display panel may be changed according to a touch event occurring on the touch panel. The display panel may output a screen for changing properties of a widget object 151 during a property change mode. For user convenience, transition to a property change mode for a widget object 151 may be made in the current screen without explicit screen transition. Upon transitioning to a property change mode, the display unit 140 may output visual effects (e.g., reversal of colors, highlighting a selected widget object, shading screen regions other than a selected widget object) under control of the control unit 160. The output of visual effects is described in more detail later with reference to FIGS. 4 to 6.

The touch panel placed at a lower or upper portion of the display panel may generate a touch event corresponding to a touch gesture made by the user and send the touch event to the control unit 160. A touch gesture may be made with a touch object such as, for example, a user's finger, a stylus, or the like. Sensing elements of the touch panel are arranged in a matrix form. When a touch event occurs on the touch panel, the sensing elements send location and type information of the touch event to the control unit 160. The touch panel may generate a touch event for changing properties of a widget object 151 at a region of the display panel at which the widget object 151 is displayed according to a user gesture. Functions of the display panel as to touch events are described in more detail later with reference to the drawings.

The storage unit 150 may store application programs realizing functions related to exemplary embodiments of the present invention, and key maps and menu maps for proper operation of the display unit 140. The key maps may correspond to various keyboard layouts including 3*4 and Qwerty layouts, and may include a control key map for controlling execution of an application program. The menu maps may include a menu map for controlling execution of an application program. The storage unit 150 may include a program region and a data region.

The program region may store an operating system (OS) for booting and for operating the mobile terminal 100, application programs for playback of music data, application programs for supporting call related functions, application programs such as a Web browser for accessing Internet servers, and application programs for viewing still images and moving images. The program region may also store a widget object change support program.

The widget object change support program includes routines for adjusting properties (e.g., size, information arrangement and information details) of a widget object 151 on the display unit 140. Specifically, the widget object change support program may include: a determination routine for transitioning to a property change mode for a widget object; a change routine for retrieving another widget object, which is identical in function to but different in type from the widget object, from the storage unit 150 and for displaying the retrieved widget object on the display unit 140 in response to occurrence of a touch event in the property change mode; and a routine for causing the currently displayed widget object to be continuously displayed on the display unit 140 after generation of a signal indicating termination of the property change mode. The determination routine determines whether to transition to the property change mode on the basis of a given touch event or input signal. As an example, the touch event may correspond to a gesture of a long touch (e.g., the control unit may distinguish between the types of touches based on the amount of time a touch is performed) or a predefined number of taps on the touch panel displaying a widget object 151. The change routine selects one of multiple widget objects that are identical in function but different in type according to a touch event from the user, and outputs the selected widget object to the display unit 140. Widget objects may be classified by function related to, for example, weather, stock, message, housekeeping, and news. Widget objects belonging to the same functional class may have different characteristics for display. For example, with regard to display characteristics, weather widget objects may be displayed in sizes of 1×2, 2×2, and 4×2. Widget objects of different types may differ in size, and the corresponding information details and information arrangement of widget objects may differ according to size. This is described in more detail with reference to FIGS. 4 to 6.

The data region is an area that stores data generated in the course of using the mobile terminal 100, and may store phonebook data, objects for widget functions and other content. The data region may store user inputs entered through the touch panel. In particular, the data region may store various widget objects that differ in function and type.

The control unit 160 controls supply of power to the components of the mobile terminal 100 for initialization. After initialization, the control unit 160 checks whether a property change function is invoked by the user for a widget object 151. When the property change function is invoked, the control unit 160 transitions to the property change mode and controls processing of signals to change properties of the widget object 151 in the property change mode. To change properties of the widget object 151, the control unit 160 may handle display of a guide frame to guide changes of widget object shapes, handle output of various widget object types according to an input signal or touch event, and output a widget object of a selected type on the display unit 140 upon termination of the property change mode. The guide frame includes one or more overlapping regions corresponding respectively to objects that are identical in function but differ in type. As an example, the control unit 160 may be configured as described below in reference to FIG. 2.

Figure 2:
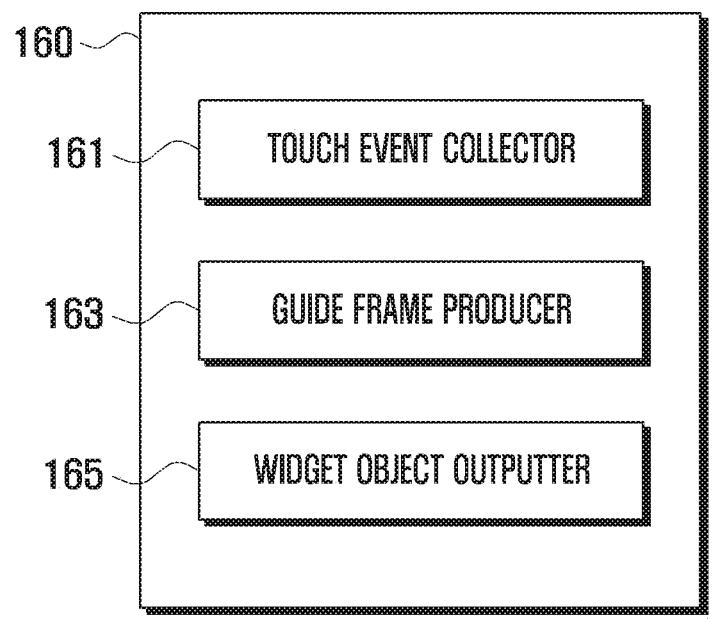
FIG. 2 is a detailed block diagram of a control unit of a mobile terminal such as, for example, the mobile terminal shown in FIG. 1 according to an exemplary embodiment of the present invention.

FIG. 2 is a detailed block diagram of a control unit 160 of the mobile terminal 100 according to an exemplary embodiment of the present invention. The operation of the control unit 160 is described with focus on touch events as input signals. However, exemplary embodiments not limited thereto or thereby. That is, to change properties of widget objects, the control unit 160 may operate according not only to touch events but also to input signals from various input means such as, for example, the input unit 120.

Referring to FIG. 2, the control unit 160 may include a touch event collector 161, a guide frame producer 163, and a widget object outputter 165.

The touch event collector 161 is configured to collect touch events occurring on the touch panel. In an exemplary embodiment, the touch event collector 161 collects touch events for changing properties of a widget object 151. Specifically, when a touch event is collected, the touch event collector 161 determines whether the collected touch event is related to property change of a widget object 151. If the collected touch event is not related to property change of a widget object 151, then the touch event collector 161 may control performance of an operation indicated by the collected touch event. If the collected touch event is related to property change of a widget object 151, then the touch event collector 161 may forward the collected touch event to the guide frame producer 163. A touch event related to property change of a widget object 151 may correspond to a gesture of long touch or a given number of taps on the touch panel displaying the widget object 151, or may correspond to a multi-touch gesture or a menu selection gesture.

Upon reception of a touch event related to property change of a widget object 151 from the touch event collector 161, the guide frame producer 163 controls an operation to enter a property change mode. The guide frame producer 163 may generate visual effects indicating transition to the property change mode. For example, the guide frame producer 163 may highlight the selected widget object 151 only and shade screen regions other than the selected widget object 151. In the property change mode, the guide frame producer 163 may output a guide frame to accommodate widget objects that are identical in function but different in type from the selected widget object 151. For example, the guide frame may be output around the widget object 151 displayed on the display unit 140. The guide frame may include one or more regions demarcated by, for example, dotted lines. As to a selected widget object 151, the number of demarcated regions in the guide frame corresponds to the number of registered widget objects that are identical in function but differ in type. For example, when three widget objects of different types are registered to widget object 151, the guide frame for the widget object 151 may include three regions, which may or may not overlap. Reference points for selecting corresponding widget objects may be marked on regions of the guide frame.

In a state wherein a guide frame for a widget object 151 is output on the display unit 140 by the guide frame producer 163, if a region of the guide frame is selected, then the widget object outputter 165 retrieves a widget object image associated with the selected region. Thereafter, if an input signal for widget object change is entered, then the widget object output unit 165 replaces the widget object 151 on the display unit 140 with the retrieved widget object image, and controls an operation to terminate the property change mode.

As described above, the mobile terminal 100 enables the user to change properties of a widget object 151 in a convenient and rapid way using a simple input scheme, and outputs multiple widget objects of the same functional category in different shapes during the change process. Hence, the user may access information in various forms.

Figure 3:
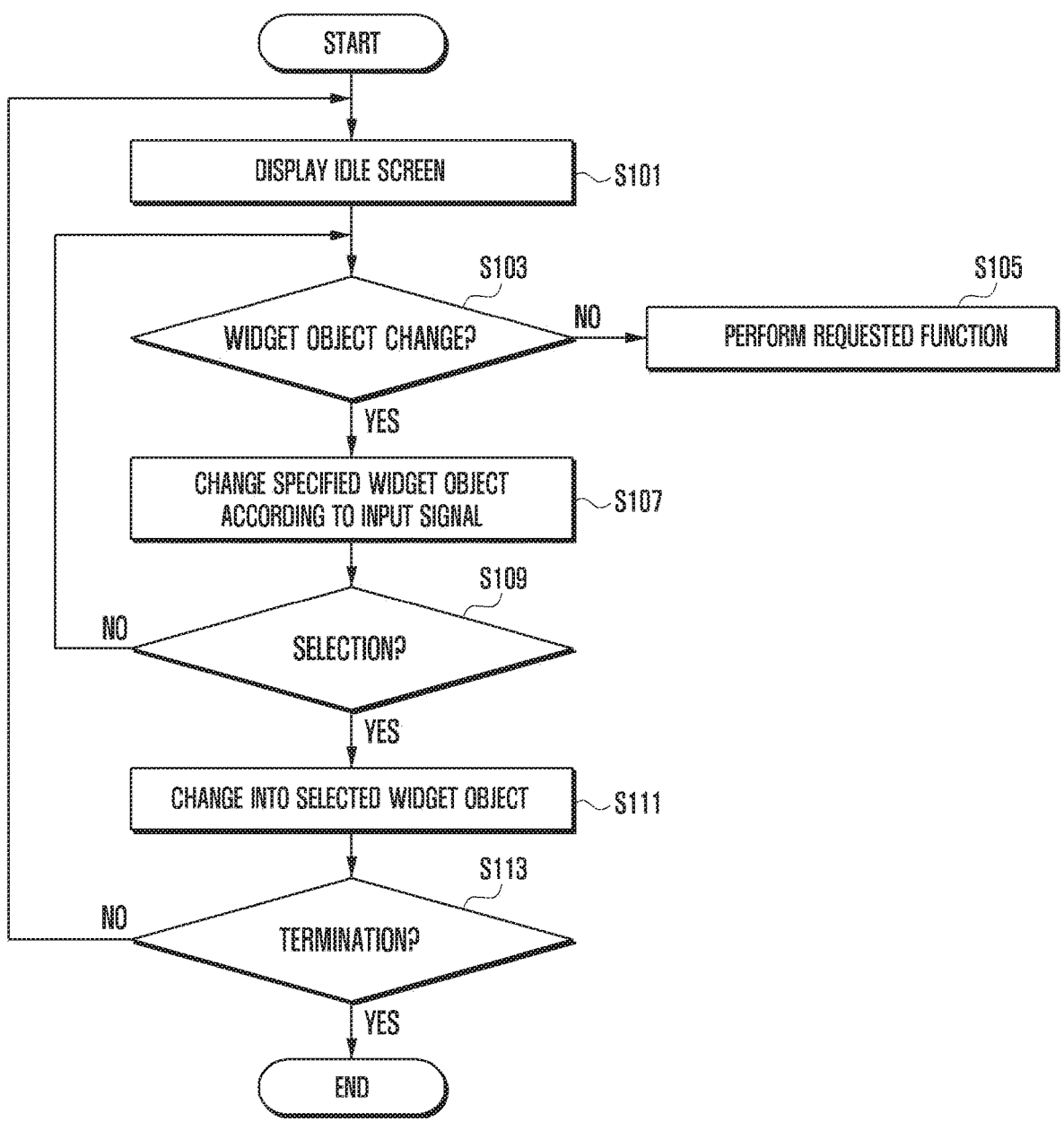
FIG. 3 is a flowchart of an object change support method for a mobile terminal according to an exemplary embodiment of the present invention.

FIG. 3 is a flowchart of a widget object change support method for the mobile terminal according to an exemplary embodiment of the present invention.

Referring to FIG. 3, in the object change support method, upon being powered on, the control unit 160 of the mobile terminal 100 supplies power to individual components, performs initialization, and displays an idle screen according to preset scheduling information at step S101.

When an input signal or touch event is generated, the control unit 160 determines whether the input signal or touch event is related to change of a widget object 151 at step S103. If the input signal or touch event is not related to change of a widget object 151, then the control unit 160 may perform a user function indicated by the input signal or touch event at step S105. For example, the control unit 160 may control an operation to perform a function related to call handling, file search, Web access, image capture, or broadcast reception.

If the input signal or touch event is related to changing of a widget object 151, the control unit 160 controls an operation to change the widget object 151 at step S107. More specifically, in response to a signal for changing a widget object 151, the control unit 160 transitions to a property change mode for the widget object 151 selected by the signal. In the property change mode, the control unit 160 identifies a number and size of widget objects that are identical in function to but different in type from the widget object 151 from the storage unit 150. The control unit 160 includes a guide frame on the basis of the identified number and size of widget objects. The control unit 160 outputs the guide frame around the widget object 151 on the display unit 140. As an example, the guide frame may include reference points facilitating selection of a new widget object to replace the current widget object 151.

Thereafter, the control unit 160 checks whether an input signal is entered for selecting a widget object from the guide frame at step S109. If an input signal is not entered for selecting a widget object, then the control unit 160 returns to step S103 and may sustain the current widget object screen to continue processing.

If a widget object is selected from the guide frame in response to occurrence of a touch event on a reference point of the guide frame, then the control unit 160 outputs the widget object associated with the reference point on the display unit 140 at step S111. The control unit 160 may output the selected widget object as a preview image, and newly output the idle screen including the selected widget object after completion of user selection. In the idle screen, the control unit 160 may replace the widget object 151 with the selected widget object without a screen transition.

After widget object change, the control unit 160 checks whether an input signal for termination is generated at step S113. If an input signal for termination is not generated, then the control unit 160 returns to step S101 and displays the idle screen updated at step S111.

Figure 4:
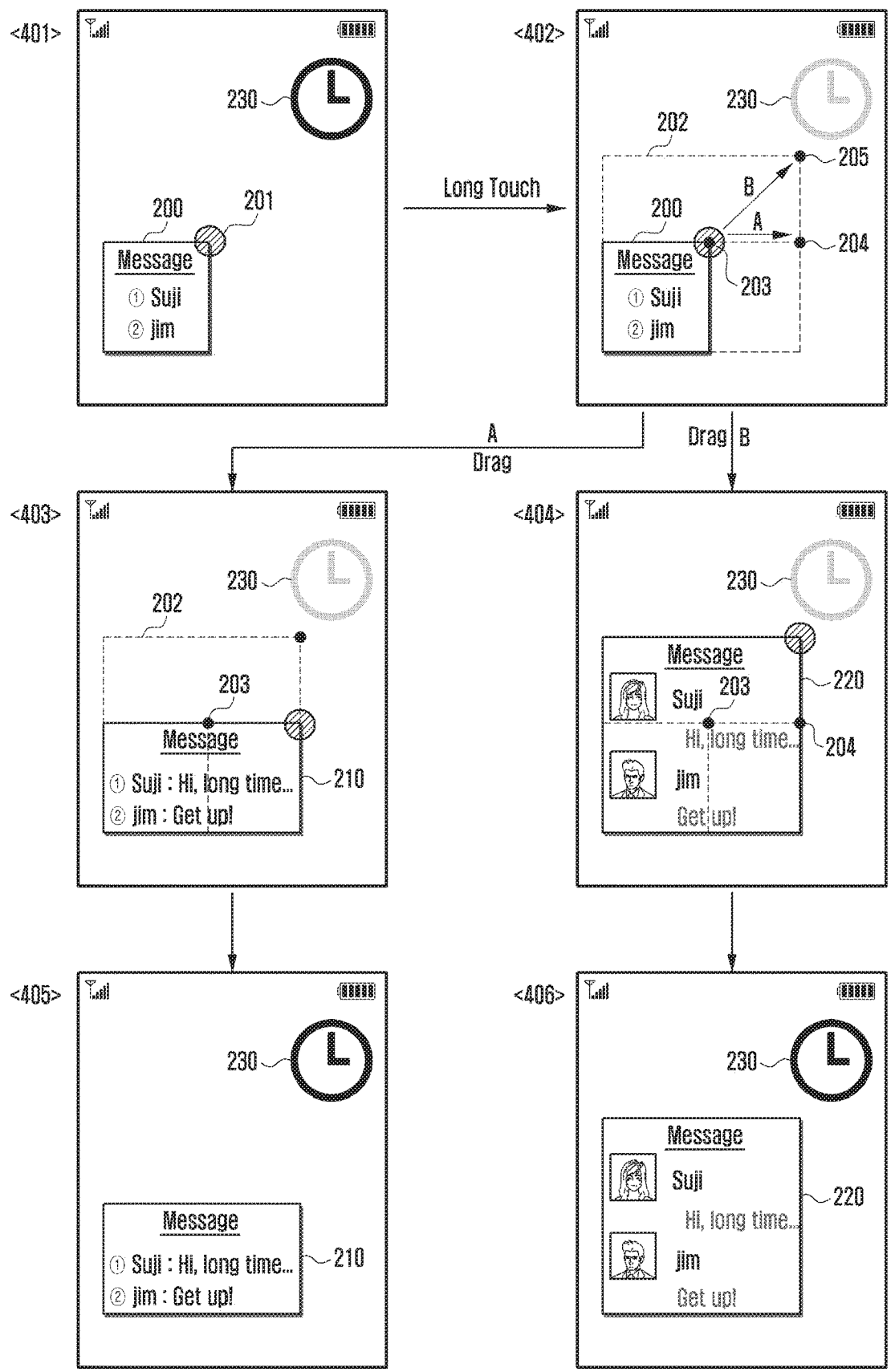
FIG. 4 is screen representations illustrating object change operations according to an exemplary embodiment of the present invention.

FIG. 4 is screen representations illustrating object change operations according to an exemplary embodiment of the present invention.

Referring to FIG. 4, upon being powered on, the mobile terminal 100 may display an idle screen on the display unit 140 according to preset scheduling information as illustrated in screen 401. For example, as illustrated in screen 401, the control unit 160 may display an idle screen including a clock widget object 230 and a message widget object 200 of a first type on the display unit 140. As an example, the clock widget object 230 indicates the current time and may change in terms of shape or image with passage of time. The message widget object 200 of the first type has a fixed size and is used to output received message text in a format suitable for the size. For example, in screen 401, the message widget object 200 of the first type has a title "Message" and sender identification information "Suji" and "Jim". For example, the sender identification information may be a character string if the corresponding sender is registered in the phonebook, or a telephone number or other form of indicia otherwise. The message widget object 200 of the first type may have a slide bar at a given portion (e.g., at the right border of the widget object) to indicate presence of additional received messages.

When a long touch event for widget object change occurs on the message widget object 200 of the first type, a guide frame 202 for widget object change may be output as illustrated in screen 402. As illustrated in screen 402, a long touch event may be used as a signal for widget object change. However, exemplary embodiments of the present invention are not limited thereto. For example, a signal for widget object change may be a preset event such as a long touch event, an event of a given number of taps, a multi-touch event, or the like. In response to the signal for widget object change, the control unit 160 identifies the number and size of registered widget objects that are identical in function to but different in type from the message widget object 200 of the first type, and outputs a guide frame 202 corresponding to the identified number and size of registered widget objects as illustrated in screen 402. For example, when two message widget objects of different types are registered as to the message widget object 200 of the first type, the guide frame 202 may have two demarcated regions. For example, the guide frame 202 may also have two reference points 204 and 205 corresponding to the two message widget objects of different types. To indicate a widget object change mode, the control unit 160 may produce visual effects. For example, other widget objects (e.g., the clock widget object 230 illustrated in screen 402) may be shaded. For user convenience and rapid widget object change, the control unit 160 may output the guide frame 202 around a region 201 at which the touch-down event has occurred at screen 401. For example, the control unit 160 may output the guide frame 202 so that the central point 203 of the guide frame 202 may correspond to the region 201 at which the touch-down event has occurred at screen 401. As a result, by making a single gesture (e.g., a long touch event) at screen 401, the user may view the guide frame 202 illustrated in screen 402.

When the user generates a signal to select a message widget object of type A in screen 402, the control unit 160 may output the message widget object 210 of type A on the display unit 140 as illustrated in screen 403. In order to select a message widget object of type A, in screen 402, the user may enter a touch event to select the reference point 204 of the guide frame 202 associated with the message widget object 210 of type A. Or, to select the message widget object 210 of type A, the user may enter a touch-down event at the central point 203 and drag in a direction 'A' to the reference point 204 while maintaining contact. In response to the above user gesture, the control unit 160 may output the message widget object 210 of type A on the display unit 140 as illustrated in screen 403. In contrast to the message widget object 200 of the first type, the message widget object 210 of type A has a larger area extended in a direction and exhibits a larger amount of information. That is, the message widget object 210 of type A may exhibit not only sender identification information but also a portion of the message text in the object image. In addition, if the user drags more than a preset distance from the central point 203 toward the reference point 204 or 205, then the control unit 160 may output a message widget object of corresponding type on the display unit 140. In other words, the control unit 160 may output a message widget object of a particular type in advance before user's drag reaches the corresponding reference point from the central point 203.

Similarly, when the user generates a signal to select a message widget object of type B in screen 402, the control unit 160 may output the message widget object 220 of type B on the display unit 140 as illustrated in screen 404. In order to select a message widget object of type B, in screen 402, the user may enter a touch event to select the reference point 205 of the guide frame 202 associated with the message widget object 220 of type B. Or, to select the message widget object 220 of type B, the user may enter a touch-down event at the central point 203 and drag in a direction of 'B' to the reference point 205 while maintaining contact. In response to the above user gesture, the control unit 160 may output the message widget object 220 of type B on the display unit 140 as illustrated in in screen 404. In contrast to the message widget object 200 of the first type or the message widget object 210 of type A, the message widget object 220 of type B has a larger object image area and exhibits a larger amount of information in the object image area. For example, the message widget object 220 of type B may exhibit sender identification information, sender image data stored in the phonebook, and some portion of message text.

When the user selects the message widget object 210 of type A in screen 402 by entering a touch event on the reference point 204 and maintaining contact (e.g., maintaining the touch object in a touch-down state in relation to the touch panel), the control unit 160 may output the message widget object 210 of type A as a preview image in screen 403. Similarly, when the user selects the message widget object 220 of type B in screen 402 by entering a touch event on the reference point 205 and maintaining contact (e.g., maintaining the touch object in a touch-down state in relation to the touch panel), the control unit 160 may output the message widget object 220 of type B as a preview image in screen 404.

Thereafter, when the user enters a touch release event in screen 403 or screen 404, the control unit 160 may replace the message widget object 200 of the first type on the display unit 140 with the message widget object 210 of type A or the message widget object 220 of type B as in screen 405 or screen 406, respectively. Hence, on the display unit 140, output of a different widget object and property change of a widget object may be handled at the same layer.

In screen 405, to replace the message widget object 210 of type A with a different message widget object like the message widget object 200 of the first type or the message widget object 220 of type B, the user may generate an input signal to enter a widget object change mode. Then, the control unit 160 may output a guide frame 202 around the message widget object 210 of type A as illustrated in screen 402. When the user selects a desired reference point of the guide frame 202 by dragging or tapping, the control unit 160 may output a different message widget object associated with the selected reference point. Similarly, in screen 406, the user may replace the message widget object 220 of type B with a different message widget object by performing actions described above. Because the guide frame 202 is output within the display image of the message widget object 220 of type B, the control unit 160 may shade the message widget object 220 of type B such that the user may clearly view the guide frame 202. Object image handling in this manner may also be applied to change procedures of other widget objects.

In the above description, touch events are used as a signal for widget object change. The input unit 120 may also be used to generate a signal for widget object change. For easy selection of a desired reference point through the input unit 120, readily inputtable indexes may be assigned to reference points associated with widget objects of different types. The storage unit 150 may pre-store object images and display formats for message widget objects that are identical in function but differ in type such as the message widget object 200 of the first type, the message widget object 210 of type A and the message widget object 220 of type B.

As described above, the object change support method of exemplary embodiments of the present invention enables the user to readily change the size and information arrangement of an object. The method uses a changeable guide frame 202 to output widget objects as preview images to thereby improve visibility of a widget object of a desired type, which is then readily output on the screen in response to a simple action like a touch release event.

Figure 5:
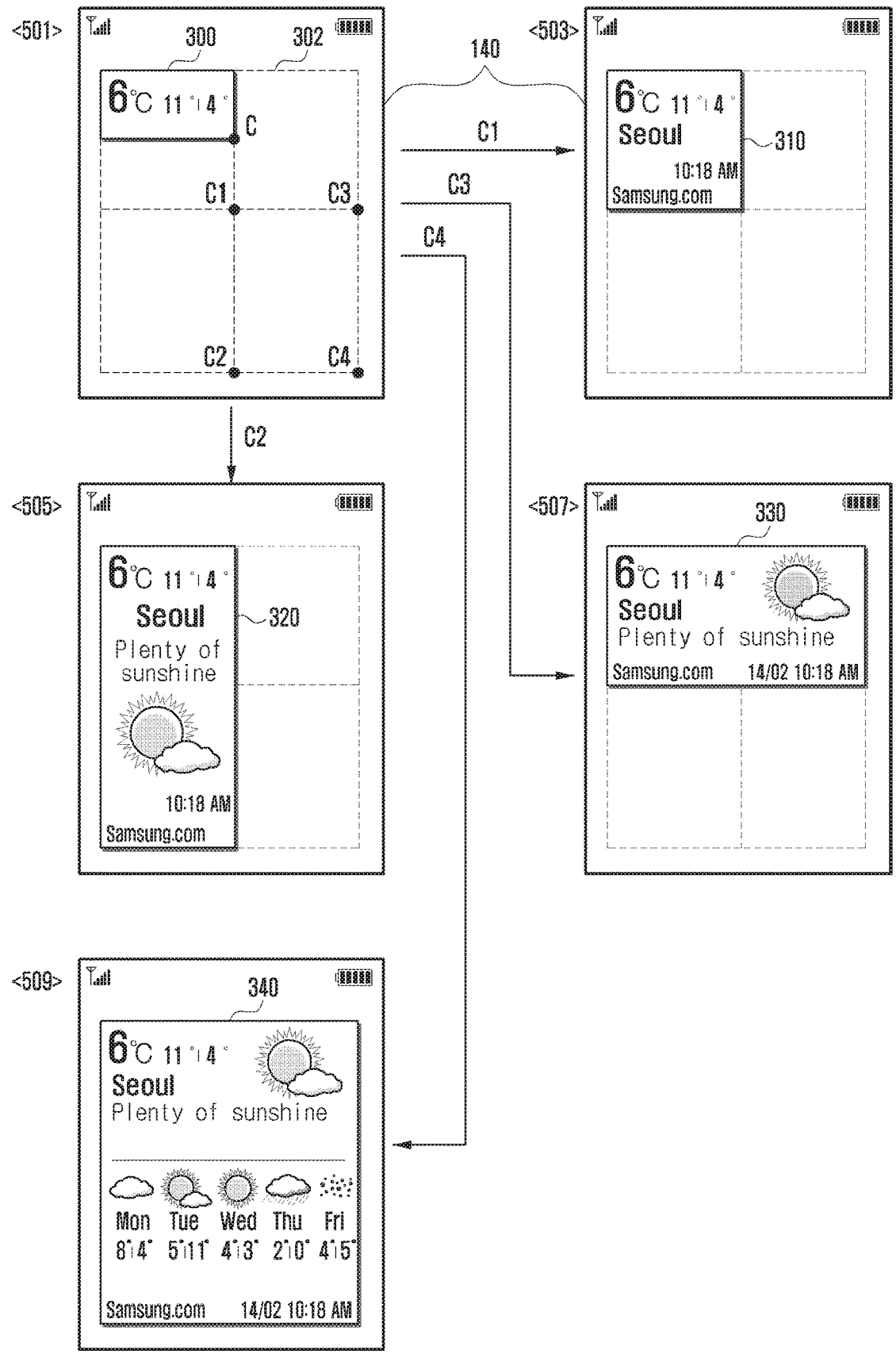
FIG. 5 is screen representations illustrating object change operations according to an exemplary embodiment of the present invention.

FIG. 5 is screen representations illustrating widget object change operations according to an exemplary embodiment of the present invention.

Referring to FIG. 5, the control unit 160 of the mobile terminal 100 may output a weather widget object 300 of a basic type on the display unit 140 according to user settings as in screen 501. If the user generates an input signal in screen 501 to change the weather widget object 300 of the basic type into one of weather widget objects 310, 320, 330 and 340 of different types, then the control unit 160 may output a guide frame 302. The guide frame 302 is associated with weather widget objects of different types, and is configured on the basis of display size, display orientation, information contents, and information arrangement of the weather widget objects. For example, as shown in screen 501, if there are five weather widget objects of different types, then the guide frame 302 may be configured to include five demarcated regions and have five reference points C, C1, C2, C3 and C4. The reference points C, C1, C2, C3 and C4 may be associated respectively with the weather widget objects of different types.

For example, if the user generates an input signal to select a first reference point C1 associated with the weather widget object 310 of the first type in screen 501, then the control unit 160 may output the weather widget object 310 of the first type on the display unit 140 as illustrated in screen 503. Depending upon design, the control unit 160 may output the weather widget object 310 of the first type as a preview image and then display the same on the screen in response to an additional signal. In contrast to the weather widget object 300 of the basic type exhibiting information related to the current temperature, and high and low temperatures for the day, the weather widget object 310 of the first type may exhibit information related to the current temperature, high and low temperatures for the day, current location, information source, and current time.

If the user generates an input signal to select a second reference point C2 associated with the weather widget object 320 of the second type in screen 501, then the control unit 160 may output the weather widget object 320 of the second type on the display unit 140 as illustrated in screen 505. The weather widget object 320 of the second type may exhibit information related to the current temperature, high and low temperatures for the day, an image and text depicting the current weather, current location, information source, and current time. If the user generates an input signal to select a third reference point C3 associated with the weather widget object 330 of the third type in screen 501, then the control unit 160 may output the weather widget object 330 of the third type on the display unit 140 as illustrated in screen 507. The weather widget object 330 of the third type may exhibit information related to the current temperature, high and low temperatures for the day, an image and text depicting the current weather, current location, information source, and current time. Finally, if the user generates an input signal to select a fourth reference point C4 associated with the weather widget object 340 of the fourth type in screen 501, then the control unit 160 may output the weather widget object 340 of the fourth type on the display unit 140 as illustrated in screen 509. The weather widget object 340 of the fourth type may exhibit information related to the current temperature, high and low temperatures for the day, an image and text depicting the current weather, weekly weather forecast, current location, information source, and current time.

As described above, the mobile terminal 100 may pre-store various types of widget objects as to a particular function and output a guide frame on the screen at which a widget object is displayed according to a user request. Then, when the user selects a reference point of the guide frame associated with a widget object of a different type, the mobile terminal 100 outputs the widget object of a different type associated with the selected reference point, facilitating easy widget object change. As an example, the widget objects of different types exhibit various forms of information that differ according to at least one of display size, display orientation, information content, and information arrangement. Hence, the user may easily change a widget object of a given type into a widget object of another type having information in a suitable size. In the above description, reference points are used to select a widget object of a different type. However, exemplary embodiments of the present invention are not limited thereto. For example, generation of a touch event on one of demarcated regions of the guide frame may cause the control unit 160 to output a widget object associated with the touched region as a preview image or display the same on the screen. In a state wherein one of the weather widget objects 310, 320, 330 and 340 of first to fourth types is displayed, if an input signal for widget object change is generated, then the control unit 160 may output the guide frame 302 on the display unit 140.

Figure 6:
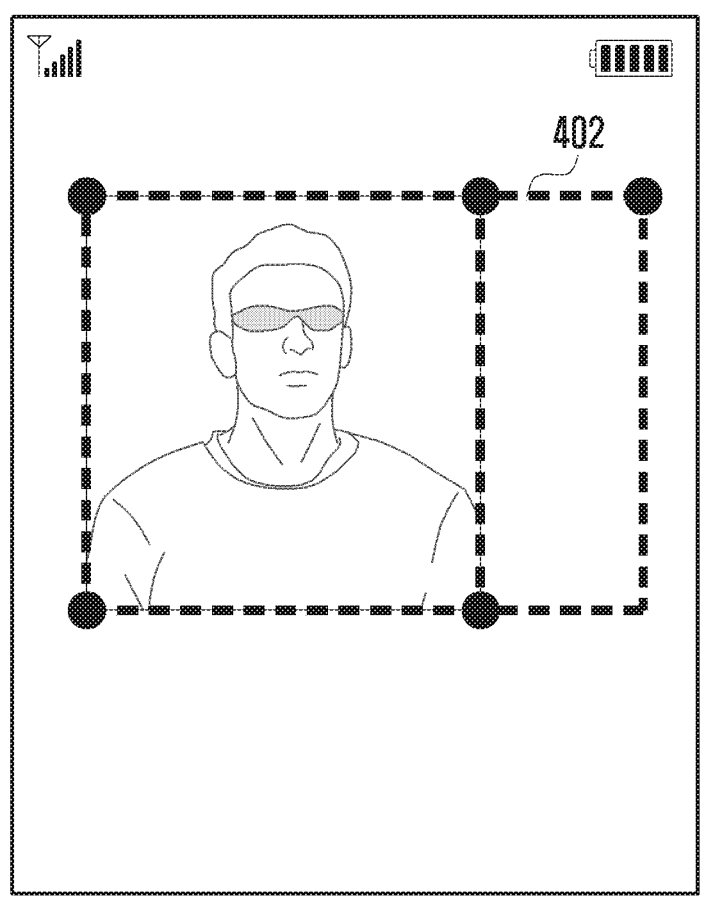
FIG. 6 is a screen representation illustrating object change operations according to an exemplary embodiment of the present invention.

Hereinabove, widget objects are utilized as objects. However, exemplary embodiments of the present invention are not limited thereto. For example, objects may correspond to image files. More specifically, as shown in FIG. 6, an object may be a picture frame object. In an object change mode for the picture frame object, the control unit 160 may generate a guide frame 402 on the basis of different image files that are included in the same folder in which the image file currently displayed in the picture frame object is included. The control unit 160 may output the generated guide frame 402 around the picture frame object on the display unit 140. If the user generates an input signal to select one of the different image files using the guide frame 402, then the control unit 160 may output the selected image file as an image of the picture frame object. The control unit 160 may output a selected image file as a preview image according to a location or type of a touch event generated on the guide frame 402. To facilitate selection of one of image files of the same size, the control unit 160 may arrange multiple reference points on one region of the guide frame 402. For example, assume that four image files having a size of 2×2 and one image file of a different size are present. The control unit 160 may assign four reference points to a region of the guide frame 402 and one reference point to another region thereof. Here, when the region for 2×2 size is demarcated by dotted lines forming a rectangle, the reference points may be placed at vertices or dotted lines. If the user selects one of the reference points, then the control unit 160 may output an image file of 2×2 size associated with the selected reference point as a preview image or directly display the same on the display unit 140 according to design. In the above description, the unit of size may correspond to several tens or hundreds of pixels, centimeters, inches or the like.

In the preceding description, a guide frame is provided. However, exemplary embodiments of the present invention are not limited thereto. For example, in response to a request for changing a current object on the display unit 140 into another object, the control unit 160 may output an object of a different type corresponding to a touch event applied to the current object (for example, drag distance and direction from the current object) as a preview image and then display the object of the different type on the display unit 140 according to a user request, or may directly display the object of the different type on the display unit 140.

In the above description, an object of a given type is changed into an object of another type. However, according to a user request, the control unit 160 may output a guide frame after outputting an object and immediately display the previously output object on the screen. Hence, after an object is output, a guide frame may be output to directly change the previously output object to an object of another type; or, objects of different types may be output according to a user request after outputting a guide frame. Alternatively, as described before, an object of a given type may be changed into an object of another type according to types and directions of input signals without outputting a guide frame.

Although not shown, the mobile terminal 100 may further include at least one of a short-range communication module for short-range communication, a camera module for capturing still or moving images of a target object, a data communication interface based on wired and wireless communication, an Internet communication module for Internet access, and a digital broadcast receiving module for playing digital broadcasts. With the digital convergence trend, it should be apparent to those skilled in the art that the mobile terminal 100 may further include a unit comparable to the above-described units, and one unit thereof may be removed or replaced with another unit.

The mobile terminal 100 of the present invention may be any device capable of displaying objects on the screen. For example, the mobile terminal 100 may be any information and communication appliance or multimedia appliance, such as a mobile communication terminal based on communication protocols supporting various communication systems, a portable multimedia player (PMP), a digital broadcast receiver, a personal digital assistant (PDA), a music player like an MP3 player, a portable game console, a smart phone, a laptop computer, a handheld computer, or the like.

In a feature of exemplary embodiments of the present invention, the object change support method enables the user to manipulate objects on the screen in an easy and convenient manner.

In addition, the object change support method provides optimized object size in advance to support rapid adjustment of objects and provide information in an optimized way.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a mobile terminal having a touch display screen to display weather information, the method comprising:

displaying a weather widget in a first predefined size on the touch display screen, the weather widget being displayable in one of a plurality of sizes including at least the first predefined size and a second predefined size, the first predefined size being smaller than the second predefined size, wherein the weather widget displayed in the first predefined size includes a first predefined plurality of information fields arranged in a first predefined nonoverlapping arrangement within the weather widget, wherein more than one of the first predefined plurality of information fields are for displaying content based on weather data received by the mobile terminal from a remote server;

in response to receiving a touch event while the weather widget is displayed in the first predefined size on the touch display screen with the first predefined plurality of information fields arranged in the first predefined nonoverlapping arrangement within the weather widget, entering a weather widget edit mode while continuing to display the weather widget in the first predefined size on the touch display screen with the first predefined plurality of information fields arranged in the first predefined nonoverlapping arrangement within the weather widget;

in response to receiving a drag touch input for increasing a size of the weather widget while the weather widget is displayed in the first predefined size on the touch display screen with the first predefined plurality of information fields arranged in the first predefined nonoverlapping arrangement within the weather widget and while the weather widget edit mode is maintained, displaying the weather widget on the touch display screen in an increased size based on the drag touch input, wherein the displaying of the weather widget on the touch display screen in the increased size based on the drag touch input includes:

upon the drag touch input reaching a threshold level at least while contact of the drag touch input is maintained on the touch display screen, displaying the weather widget on the touch display screen in the second predefined size with the first predefined plurality of information fields and a second predefined plurality of information fields collectively arranged in a second predefined nonoverlapping arrangement within the weather widget, wherein more than one of the first predefined plurality of information fields are displayed in a same location within the weather widget in both the first predefined nonoverlapping arrangement and the second predefined nonoverlapping arrangement, and more than one of the first predefined plurality of information fields are displayed in a different location within the weather widget in both the first predefined nonoverlapping arrangement and the second predefined nonoverlapping arrangement, wherein more than one of the second predefined plurality of information fields are for displaying content based on the weather data received by the mobile terminal from the remote server; and in response to receiving another touch event after the drag touch input is discontinued and after the weather widget is displayed in the second predefined size with the first predefined plurality of information fields and the second predefined plurality of information fields collectively arranged in the second predefined nonoverlapping arrangement within the weather widget:

exiting from the edit mode, setting the weather widget in the second predefined size with the first predefined plurality of information fields and the second predefined plurality of information fields collectively arranged in the second predefined nonoverlapping arrangement within the weather widget, and continuing the displaying of the weather widget on the touch display screen in the second predefined size with the first predefined plurality of information fields and the second predefined plurality of information fields collectively arranged in the second predefined nonoverlapping arrangement within the weather widget.

2. The method of claim 1, wherein the first predefined plurality of information fields includes at least:
a current time information field presenting current time information using alphanumeric characters,
a current date information field presenting current date information using alphanumeric characters,
a current location information field presenting current location information using alphanumeric characters,
a current temperature information field presenting current temperature information using alphanumeric characters,
a low temperature information of a current date field presenting low temperature information of the current date using alphanumeric characters,
a high temperature information of the current date field presenting high temperature information of the current date using alphanumeric characters, and
a weather graphic of the current date field presenting a predefined graphical representation corresponding to current weather conditions among a plurality of predefined graphical representations respectively corresponding to different weather conditions.

3. The method of claim 1, wherein the second predefined plurality of information fields includes, for each of a plurality of future dates other than the current date, at least:
a low temperature information of a respective date field presenting low temperature information of the respective date using alphanumeric characters,
a high temperature information of the respective date field presenting high temperature information of the respective date using alphanumeric characters,
a day of a week information of the respective date field presenting day of the week information of the respective date using alphanumeric characters, and
a weather graphic of the respective date field presenting a predefined graphical representation corresponding to weather conditions of the respective date among a plurality of predefined graphical representations respectively corresponding to different weather conditions.

4. The method of claim 3, wherein the day of the week information of the respective date presented using alphanumeric characters is an abbreviation of the day of the week.

5. The method of claim 1, further comprising:
while the weather widget is displayed in the first predefined size on the touch display screen with the first predefined plurality of information fields arranged in the first predefined nonoverlapping arrangement within the weather widget, updating the more than one of the first predefined plurality of information fields based on the weather data received by the mobile terminal from the remote server; and
while the weather widget is displayed in the second predefined size on the touch display screen with the first predefined plurality of information fields and the second predefined plurality of information fields collectively arranged in the second predefined nonoverlapping arrangement within the weather widget, updating the more than one of the first predefined plurality of information fields and the more than one of the second predefined plurality of information fields, based on the weather data received by the mobile terminal from the remote server.

6. The method of claim 1, wherein the more than one of the first predefined plurality of information fields displayed in the same location within the weather widget in both the first predefined nonoverlapping arrangement and the second predefined nonoverlapping arrangement are displayed in a same size within the weather widget in both the first predefined nonoverlapping arrangement and the second predefined nonoverlapping arrangement.

7. The method of claim 1, further comprising:
upon entering the weather widget edit mode while continuing to display the weather widget in the first predefined size on the touch display screen with the first predefined plurality of information fields arranged in the first predefined nonoverlapping arrangement within the weather widget, displaying at least one of guidelines or reference points on the touch display screen for assisting a user in increasing the size of the weather widget.

8. The method of claim 7, wherein the reference points are displayed at locations on the touch display screen based on at least one of the first predefined size or the second predefined size.

9. The method of claim 1, wherein in the second predefined nonoverlapping arrangement, the second predefined plurality of information fields are displayed in a portion of the weather widget displayed in the second predefined size excluding the portion of the weather widget displayed in the second predefined size that corresponds to the weather widget displayed in the first predefined size.

10. The method of claim 1, wherein in the second predefined nonoverlapping arrangement, more than one of the first predefined plurality of information fields are displayed in a portion of the weather widget displayed in the second predefined size excluding the portion of the weather widget displayed in the second predefined size that corresponds to the weather widget displayed in the first predefined size.

11. The method of claim 1, wherein the threshold level is reachable before the drag touch input reaches a boundary of the weather widget in the second predefined size.

12. The method of claim 1, wherein the touch event comprises a long touch input occurring on the weather widget for greater than a predetermined period of time.

13. The method of claim 1, wherein the weather widget is displayed on the touch display screen in both the first predefined size and the second predefined size without another widget displayed to either a left or right of the weather widget.

14. The method of claim 1, wherein, when increasing in size from the first predefined size to the second predefined size, the weather widget expands in one direction.

15. A mobile terminal comprising:
a touch display screen; and
a processor configured to:
control to display a weather widget in a first predefined size on the touch display screen, the weather widget being displayable in one of a plurality of sizes including at least the first predefined size and a second predefined size, the first predefined size being smaller than the second predefined size, wherein the weather widget displayed in the first predefined size includes a first predefined plurality of information fields arranged in a first predefined nonoverlapping arrangement within the weather widget, wherein more than one of the first predefined plurality of information fields are for displaying content based on weather data received by the mobile terminal from a remote server;

in response to receiving a touch event while the weather widget is displayed in the first predefined size on the touch display screen with the first predefined plurality of information fields arranged in the first predefined nonoverlapping arrangement within the weather widget, enter a weather widget edit mode while continuing to display the weather widget in the first predefined size on the touch display screen with the first predefined plurality of information fields arranged in the first predefined nonoverlapping arrangement within the weather widget;

in response to receiving a drag touch input for increasing a size of the weather widget while the weather widget is displayed in the first predefined size on the touch display screen with the first predefined plurality of information fields arranged in the first predefined nonoverlapping arrangement within the weather widget and while the weather widget edit mode is maintained, control to display the weather widget on the touch display screen in an increased size based on the drag touch input, wherein the control to display the weather widget on the touch display screen in the increased size based on the drag touch input includes:

upon the drag touch input reaching a threshold level at least while contact of the drag touch input is maintained on the touch display screen, control to display the weather widget on the touch display screen in the second predefined size with the first predefined plurality of information fields and a second predefined plurality of information fields collectively arranged in a second predefined nonoverlapping arrangement within the weather widget, wherein more than one of the first predefined plurality of information fields are displayed in a same location within the weather widget in both the first predefined nonoverlapping arrangement and the second predefined nonoverlapping arrangement, and more than one of the first predefined plurality of information fields are displayed in a different location within the weather widget in both the first predefined nonoverlapping arrangement and the second predefined nonoverlapping arrangement, wherein more than one of the second predefined plurality of information fields are for displaying content based on the weather data received by the mobile terminal from the remote server; and in response to receiving another touch event after the drag touch input is discontinued and after the weather widget is displayed in the second predefined size with the first predefined plurality of information fields and the second predefined plurality of information fields collectively arranged in the second predefined nonoverlapping arrangement within the weather widget:

exit from the edit mode, set the weather widget in the second predefined size with the first predefined plurality of information fields and the second predefined plurality of information fields collectively arranged in the second predefined nonoverlapping arrangement within the weather widget, and control to continuing to display the weather widget on the touch display screen in the second predefined size with the first predefined plurality of information fields and the second predefined plurality of information fields collectively arranged in the second predefined nonoverlapping arrangement within the weather widget.

16. The mobile terminal of claim 15, wherein the first predefined plurality of information fields includes at least:
a current time information field presenting current time information using alphanumeric characters,
a current date information field presenting current date information using alphanumeric characters,
a current location information field presenting current location information using alphanumeric characters,
a current temperature information field presenting current temperature information using alphanumeric characters,
a low temperature information of a current date field presenting low temperature information of the current date using alphanumeric characters,
a high temperature information of the current date field presenting high temperature information of the current date using alphanumeric characters, and
a weather graphic of the current date field presenting a predefined graphical representation corresponding to current weather conditions among a plurality of predefined graphical representations respectively corresponding to different weather conditions.

17. The mobile terminal of claim 15, wherein the second predefined plurality of information fields includes, for each of a plurality of future dates other than the current date, at least:
a low temperature information of a respective date field presenting low temperature information of the respective date using alphanumeric characters,
a high temperature information of the respective date field presenting high temperature information of the respective date using alphanumeric characters,
a day of a week information of the respective date field presenting day of the week information of the respective date using alphanumeric characters, and
a weather graphic of the respective date field presenting a predefined graphical representation corresponding to weather conditions of the respective date among a plurality of predefined graphical representations respectively corresponding to different weather conditions.

18. The mobile terminal of claim 17, wherein the day of the week information of the respective date presented using alphanumeric characters is an abbreviation of the day of the week.

19. The mobile terminal of claim 15, wherein the processor is further configured to:
while the weather widget is displayed in the first predefined size on the touch display screen with the first predefined plurality of information fields arranged in the first predefined nonoverlapping arrangement within the weather widget, update the more than one of the first predefined plurality of information fields based on the weather data received by the mobile terminal from the remote server; and
while the weather widget is displayed in the second predefined size on the touch display screen with the first predefined plurality of information fields and the second predefined plurality of information fields collectively arranged in the second predefined nonoverlapping arrangement within the weather widget, update the more than one of the first predefined plurality of information fields and the more than one of the second predefined plurality of information fields, based on the weather data received by the mobile terminal from the remote server.

20. The mobile terminal of claim 15, wherein the more than one of the first predefined plurality of information fields displayed in the same location within the weather widget in both the first predefined nonoverlapping arrangement and the second predefined nonoverlapping arrangement are displayed in a same size within the weather widget in both the first predefined nonoverlapping arrangement and the second predefined nonoverlapping arrangement.

21. The mobile terminal of claim 15, wherein the processor is further configured to, upon entering the weather widget edit mode while continuing to display the weather widget in the first predefined size on the touch display screen with the first predefined plurality of information fields arranged in the first predefined nonoverlapping arrangement within the weather widget, control to display at least one of guidelines or reference points on the touch display screen for assisting a user in increasing the size of the weather widget.

22. The mobile terminal of claim 21, wherein the reference points are displayed at locations on the touch display screen based on at least one of the first predefined size or the second predefined size.

23. The mobile terminal of claim 15, wherein in the second predefined nonoverlapping arrangement, the second predefined plurality of information fields are displayed in a portion of the weather widget displayed in the second predefined size excluding the portion of the weather widget displayed in the second predefined size that corresponds to the weather widget displayed in the first predefined size.

24. The mobile terminal of claim 15, wherein in the second predefined nonoverlapping arrangement, more than one of the first predefined plurality of information fields are displayed in a portion of the weather widget displayed in the second predefined size excluding the portion of the weather widget displayed in the second predefined size that corresponds to the weather widget displayed in the first predefined size.

25. The mobile terminal of claim 15, wherein the threshold level is reachable before the drag touch input reaches a boundary of the weather widget in the second predefined size.

26. The mobile terminal of claim 15, wherein the touch event comprises a long touch input occurring on the weather widget for greater than a predetermined period of time.

27. The mobile terminal of claim 15, wherein the weather widget is displayed on the touch display screen in both the first predefined size and the second predefined size without another widget displayed to either a left or right of the weather widget.

28. The mobile terminal of claim 15, wherein, when increasing in size from the first predefined size to the second predefined size, the weather widget expands in one direction.

* * * * *